UNITED STATES PATENT OFFICE.

HERMANN HILDEBRANDT, OF HALLE-ON-THE-SAALE, GERMANY.

PROCESS OF MANUFACTURING CONDENSATION PRODUCTS FROM FORMALDEHYDE, TANNIN, AND AROMATIC MONOHYDROXYL COMPOUNDS.

No. 876,311.

Specification of Letters Patent.

Patented Jan. 7, 1908.

Application filed February 21, 1907. Serial No. 358,579. (Specimens.)

*To all whom it may concern:*

Be it known that I, HERMANN HILDEBRANDT, a doctor of medicine, and a subject of the German Emperor, and a resident of 22ª Magdeburger-strasse, in the city of Halle-on-the-Saale, Kingdom of Prussia, and German Empire, have invented a certain new and useful Process for Manufacturing Condensation Products from Formaldehyde, Tannin, and Aromatic Monohydroxyl Compounds, of which the following is a specification.

This invention has reference to condensation products of formaldehyde with tannin or tannic acid of any source whatever with that class of phenolic bodies, which contain only one free hydroxyl-group, but no other free or substituted hydroxyl-groups, such as ordinary phenol, thymol, carvacrol, creosol, xylenol, alpha- and beta-napthol, salicylic acid. By condensation with formaldehyde, the said class of bodies, by replacing the oxygen of the formaldehyde, form compounds containing mono-oxy-benzyl or the methan-phenol-radical $C_6H_4(OH)CH_2$. Compounds of this kind have been found to be valuable remedies and they have proved to be especially valuable in diseases of the intestinal tract. They possess the decided astringent properties of the ordinary tannin or tannic acid, which properties are still increased by the combination with the phenolic body, and they are free from any injurious irritating action upon the intestinal system. Owing to the insolubility in acid of the monoxy-benzyl-compounds mentioned above, they will not clog the intestinal tract and will not overtax the stomach and they produce a more decided and more reliable antiseptic action in the intestinal system, in view of the phenol-derivatives contained in their respective molecules, than those condensation products heretofore obtained by the condensation of formaldehyde with phenolic bodies, containing more than one free or substituted hydroxyl-group, the astringent properties of which compounds were very defective and were accompanied by very marked, irritating properties. Formaldehyde condensation products of this kind, that is to say with phenolic bodies, containing either two free or two substituted hydroxyl-groups or one free hydroxyl-group and another substituted hydroxyl-group, as obtained before my invention, have for instance been manufactured both with formaldehyde alone as well as with formaldehyde and a phenolic body, such as resorcin, tannin and the like, and from cotoin, the active principle of the coto-bark, which constitutes the 4-methyl-ether of the 2-4-6-trioxybenzophenon, being a derivative of the phloroglucin and possessing the formula

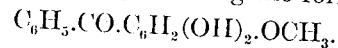

$C_6H_5.CO.C_6H_2(OH)_2.OCH_3$.

By condensation with formaldehyde alone cotoin forms methylen-cotoin $CH_2(C_{14}H_{11}O_4)_2$, while condensation with cotoin and a phenolic body produces substitution products of the cotoin, such as methylen-cotoin-tannin. Other condensation products with formaldehyde heretofore known, are those obtained from formaldehyde and tannin with guaiacol, or with wood creosote, or with eugenol or pyrogallol and the ether derivatives of these bodies. The condensation product with guaiacol is described in French Patent 280851 and patent of addition thereto, the creosote condensation product is described in British Patent 5650/1899.

From all the previously known condensation products referred to, my invention is distinguished by producing bodies all of which contain the monoxy-benzyl radical, sometimes also called the methan-phenole-radical $C_6H_4.OH.CH_2$ and no additional free or substituted hydroxyl. These bodies are also distinguished by the novel therapeutic effect which they produce upon the human system, that is to say their absence of injurious irritating action.

The preparation of the new tannin or tannic acid compounds is preferably effected by mixing the alcoholic solution of the particular phenolic body with the aqueous solution of tannin, using molecular quantities of each substance, thus for instance 15 grams thymol, or 9.4 grams phenol and 32.2 grams tannic acid and then adding to this mixture two or three times the amount of the calculated quantity of a 40-per. cent. solution of formaldehyde. While the mass is being kept constantly stirred, the mixture is then poured into twenty times the amount of concentrated hydrochloric acid of say 38% HCl which would correspond to the amount of tannin or tannic acid employed. The amount of hydrochloric acid should be at least ten times the volume of the combined alcoholic and aqueous solutions of the phenolic body, formaldehyde and tannin or tannic acid. After allowing to stand for some time, dilute with water, in order to facilitate the subsequent removal of the acid. The precipitate, obtained by the treatment with the mineral acid is then washed with water, in order to remove the bulk of the acid, though for ordinary uses it is not necessary to wash out every trace of hydrochloric acid. The washing may either be done on a filter or by decantation in a tall vessel, where the precipitate is allowed to deposit and the liquid is poured off. Then the precipitate is finally dried at ordinary temperature, which may be facilitated in the ordinary manner by first sucking off from the precipitate the moisture, yet adhering to it. The condensation product is obtained by the pouring of the mixture into the acid which precipitates the said product. If desired, the precipitate may also be washed at once after precipitation; it is however sometimes desirable to allow to stand for a short time, so as to allow the precipitate to collect.

It is of course immaterial from what source the tannin or tannic acid is derived. This in place of ordinary tannic acid extracts of tannic acid containing drugs may be used, such as extracts of nut-galls, of canaigre, of cutch, of oak bark.

The process is applicable to phenolic bodies of any kind, of the class referred to and free from oxy-alkyl-groups and instead of the derivatives of the benzolic series, the derivatives of the naphthalene, such as alpha-naphthol, and beta-naphthol may be used. The process may also be applied to the ester combinations of the phenolic bodies mentioned, such as acetyl-thymol, benzoyl-thymol, acetyl-salicylic acid. Thus the following compounds may be obtained: tannin-phenol-methan $CH_2(C_6H_5O)-(C_{14}H_9O_9)$, being a loose, whitish powder which is insoluble in alcohol and soluble in alkalies; it does not melt at 240 degrees centigrade. Tannin-thymol-methan $CH_2(C_{10}H_{13}O)-(C_{14}H_9O_9)$, is a faintly colored, odorless powder which is readily soluble in alcohol, from which solution it can not be precipitated by water. It is soluble in alkalies and melts with decomposition at about 235 degrees centigrade. The condensation by which these products are formed and by which one molecule of water is set free, is effected by the removal of one atom of hydrogen from each of the two substances which combine with the $CH_2$-group, the said hydrogen being removed from the phenol-group, according to the following equation:

$$CH_2O + C_{14}H_{10}O_9 + C_6H_3.CH_3.C_3H_7.OH = H_2O + CH_2(C_{14}H_9O_9)(C_6H_2.CH_3.C_3H_7.OH.)$$

in the case of the above mentioned thymol compound.

What I claim and desire to secure by Letters Patent of the United States is:—

1. The process of manufacturing condensation products from tannin by means of formaldehyde, which process consists in mixing a solution of any substance of the aromatic series containing one free unsubstituted hydroxyl-group and free from substituted oxy-groups, with a solution of a tannin in substantially molecular proportions, adding formaldehyde to the mixture produced largely in excess of the theoretical quantity, pouring the mixture thus obtained in a great excess of hydrochloric acid, to produce condensation, separating the precipitate obtained and drying said precipitate.

2. The process of manufacturing condensation products from tannin by means of formaldehyde, which process consists in mixing a solution of any aromatic compound containing monoxy-benzyl with a solution of tannin in substantially molecular quantities, adding formaldehyde largely in excess of the theoretical quantity, pouring the mixture thus obtained in a great excess of hydrochloric acid, to produce condensation and precipitation, separating the precipitate obtained and drying said precipitate.

3. The process of manufacturing condensation products from tannin by means of formaldehyde, which process consists in mixing an alcoholic solution of thymol with a watery solution of a tannin, in substantially molecular proportions, adding 40% formaldehyde largely in excess of the theoretical quantity, pouring the mixture thus obtained in a great excess of concentrated hydrochloric acid to produce condensation and precipitation, separating the precipitate from the liquid, and then washing the precipitate and drying said precipitate.

4. The herein described condensation product of thymol with formaldehyde and tannin, the said product being insoluble in water, and soluble in alkali, and soluble in alcohol, and melting with decomposition at about 235 degrees centigrade.

Signed at Leipzig, Germany this 5th day of February, 1907.

HERMANN HILDEBRANDT.

Witnesses:
RUDOLPH FRICKE,
SOUTHARD P. WARNER.